(12) United States Patent
Sikra

(10) Patent No.: US 9,240,169 B2
(45) Date of Patent: Jan. 19, 2016

(54) PIVOT SUPPORTS FOR DRUM RIM

(71) Applicant: Drum Workshop, Inc., Oxnard, CA (US)

(72) Inventor: Richard A Sikra, Thousand Oaks, CA (US)

(73) Assignee: DRUM WORKSHOP, INC., Oxnard, CA (US)

( * ) Notice: Subject to any disclaimer, the term of this patent is extended or adjusted under 35 U.S.C. 154(b) by 196 days.

(21) Appl. No.: 13/663,655

(22) Filed: Oct. 30, 2012

(65) Prior Publication Data

US 2014/0041507 A1  Feb. 13, 2014

(51) Int. Cl.
*G10D 13/02* (2006.01)
*G10D 13/00* (2006.01)
*F16B 2/06* (2006.01)

(52) U.S. Cl.
CPC .............. *G10D 13/006* (2013.01); *F16B 2/06* (2013.01); *G10D 13/003* (2013.01); *G10D 13/02* (2013.01); *Y10T 403/7062* (2015.01)

(58) Field of Classification Search
CPC ........................... G10D 13/006; G10D 13/026
See application file for complete search history.

(56) References Cited

U.S. PATENT DOCUMENTS

| | | | |
|---|---|---|---|
| 1,042,919 A | 10/1912 | Hughes | |
| 2,396,823 A * | 3/1946 | Burbank et al. | ........... 74/424.71 |
| 2,446,508 A | 8/1948 | Crowell | |
| 2,894,548 A * | 7/1959 | Peck et al. | ..................... 269/258 |
| 3,051,028 A * | 8/1962 | Kreger | ............................. 81/351 |
| 3,052,462 A * | 9/1962 | Butler | ........................... 269/249 |
| 3,055,254 A | 9/1962 | Haviland | |
| 3,316,792 A | 5/1967 | Ippolito | |
| 3,336,642 A * | 8/1967 | Armacost | ........................ 24/523 |
| 3,426,640 A | 2/1969 | Slingerland | |
| 3,722,349 A | 3/1973 | Hoellerich | |
| 3,807,718 A * | 4/1974 | Sendoykas | .......................... 269/6 |
| 4,083,624 A * | 4/1978 | Timmer | .......................... 439/803 |
| 4,747,588 A | 5/1988 | Dillhoff | |
| 5,185,489 A * | 2/1993 | Hoshino | ...................... 84/422.1 |
| 5,317,946 A | 6/1994 | Hoshino | |
| 5,421,235 A | 6/1995 | Lombardi | |
| 5,565,637 A * | 10/1996 | Shigenaga | ................... 84/422.1 |
| 5,627,332 A | 5/1997 | Lombardi | |
| 5,726,370 A | 3/1998 | Yanagisawa | |
| D402,683 S | 12/1998 | Brewster et al. | |
| 6,011,208 A * | 1/2000 | Hoshino | ...................... 84/422.1 |
| 6,147,288 A | 11/2000 | Liao | |

(Continued)

OTHER PUBLICATIONS

International Preliminary Report on patentability from corresponding application No. PCT/US2013/067611, dated May 14, 2015.

*Primary Examiner* — Robert W Horn
(74) *Attorney, Agent, or Firm* — Koppel, Patrick, Heybl & Philpott

(57) ABSTRACT

In a drum beating assembly, the combination comprising a frame, including at least one pedestal, an axle carried by the pedestal to rotate relative thereto, the axle having an axis of rotation, a drum beater carried by the axle, a pedal operatively connected to the axle to rotate the axle and beater in response to pedal movement, the frame including a base plate, there being a clamp arm and means supporting the arm on the plate to pivot relative thereto, and multiple drum rim support elements carried to engage the drum rim at multiple locations to support the drum rim relative to the base plate. The support elements are typically pivotable to self-adjust during clamp up.

32 Claims, 4 Drawing Sheets

(56) References Cited

U.S. PATENT DOCUMENTS

| | | | |
|---|---|---|---|
| 6,166,312 A * | 12/2000 | Brewster et al. | 84/422.1 |
| 6,331,666 B1 * | 12/2001 | Chang | 84/422.1 |
| 6,538,184 B2 | 3/2003 | Hsieh | |
| 6,596,934 B2 | 7/2003 | Hsieh | |
| 6,632,990 B2 | 10/2003 | Menzel | |
| 6,648,314 B1 | 11/2003 | Degen et al. | |
| 6,992,244 B2 | 1/2006 | Paul et al. | |
| 7,104,166 B1 * | 9/2006 | Wong | 81/423 |
| 7,373,862 B2 * | 5/2008 | Tyler | B25B 5/12 81/367 |
| 7,381,877 B2 * | 6/2008 | Shigenaga | 84/422.1 |
| 7,399,916 B1 * | 7/2008 | Lombardi | 84/422.1 |
| 7,408,104 B2 * | 8/2008 | Sato | 84/422.1 |
| 7,415,912 B2 * | 8/2008 | Tyler | 81/367 |
| 7,812,237 B1 | 10/2010 | Dunnett | |
| 7,897,858 B1 * | 3/2011 | Liao | 84/422.1 |
| 8,022,282 B1 * | 9/2011 | Burns | 84/421 |
| 8,267,389 B2 * | 9/2012 | Roesch et al. | 269/249 |
| 8,455,746 B2 * | 6/2013 | Johnston et al. | 84/422.1 |
| 8,740,208 B2 * | 6/2014 | Hagan et al. | 269/143 |
| 2002/0194981 A1 * | 12/2002 | Hsieh | 84/422.1 |
| 2006/0043662 A1 | 3/2006 | Blake | |
| 2007/0169611 A1 | 7/2007 | Chen | |
| 2009/0235806 A1 * | 9/2009 | Chen | 84/422.1 |
| 2010/0013136 A1 * | 1/2010 | Strauss et al. | 269/90 |
| 2011/0030532 A1 * | 2/2011 | Nakata et al. | 84/422.1 |
| 2012/0000344 A1 * | 1/2012 | Sato et al. | 84/422.1 |
| 2014/0041507 A1 * | 2/2014 | Sikra | 84/411 R |

* cited by examiner

PIVOT SUPPORTS FOR DRUM RIM

BACKGROUND OF THE INVENTION

1. Field of the Invention

This invention relates generally to drum beating apparatus connectable to drums, such as bass drum rims, and more particularly concerns stabilized connection of beater base plates to bass drum rims. In a more general sense, this invention relates to adjustable clamping systems.

2. Description of the Related Art

There is need for stabilization of such connections, and particularly prevention of disconnection during drum beating. This is a problem due to relatively heavy sizes and weights of bass drums to be and remain accurately connected to drum beaters over extended use periods. There is also need for the particularly efficient and reliable connection modes and apparatus as enabled and provided by the present invention.

Systems for connecting a drum beating apparatus to a drum rim are well known in the art. However, many of these systems can be unstable and become disconnected due to the drum beating motion. Some clamping systems have attempted to remedy the disconnection problem; however, even if successful, other problems can remain. For example, while the clamping system and drum beating apparatus may stay in position relative to the drum rim, the rim and beating apparatus combination may still be unstable and may rock. Further, many clamping systems cause the drum rim to warp or deteriorate, often due to the rigidity of the connection and the inability of the clamping system to adjust to any movement of the drum rim which may occur. Another common problem is centering the clamping system on the drum rim. If the system is not positioned exactly, then part of the drum beating apparatus may lift off the floor when the clamping system is tightened. Further, if the floor is not exactly flat, positioning of the clamping system is made even more difficult. These problems can cause difficulties both in set up and if the drum and/or drum beating apparatus shift(s) during operation.

SUMMARY OF THE INVENTION

Briefly, and in general terms, the invention is directed to a clamping system that can be used with a drum beating assembly and a drum. In some embodiments, the clamping system is attached to a drum beating assembly and includes caps that can swivel adjust, caps on a pivot assembly, and/or caps that can swivel adjust and are on a pivot assembly. The caps can engage both the inner and outer surfaces of a drum rim to secure the connection between the drum beating assembly and the drum. In some embodiments, the caps redistribute the forces between the cap and the surface, sometimes so that the forces are evenly distributed across the cap and sometimes so that warping of the rim is prevented. In other embodiments, the caps adjust so as to prevent a rocking motion of the clamping system, the drum, or both.

It is a major object of the invention to provide improved apparatus meeting the above needs as well as other needs and objectives. Basically, the invention is embodied in the combination that includes:

a) a frame, including at least one pedestal,
b) an axle carried by the pedestal to rotate relative thereto, the axle having an axis of rotation,
c) a drum beater carried by the axle,
d) a pedal operatively connected to the axle to rotate the axle and beater in response to pedal movement,
e) the frame including a base plate, there being a clamp arm and means supporting the arm on the plate to pivot relative thereto, and
f) multiple drum rim support elements carried to engage the drum rim at multiple locations to support the drum rim relative to the base plate.

As will be seen, at least one, and typically at least two of such elements are provided to be pivotally self-adjusting during engagement of the elements with a drum rim. Further, there are preferably three of such support elements, at least one of which is or are pivotally self-adjustable and located to engage the convex side of a drum rim that has both convex and concave sides.

Further self-adjustment is enhanced and facilitated as by toggle support of one or more of the elements, enabling universal directional pivoting, during clamp-up.

Another object includes provision of a carrier, such as a plate, connectible to the base plate, the carrier carrying at least two of said elements, that are engagable with the convex side of a drum rim. A third of the elements may then be carried by the arm, to engage the concave side of the drum rim, in response to arm pivoting relative to the base plate.

As will be seen, and for enhanced and balanced clamping force distribution, the third element is typically located in a plane substantially normal to an axis passing through the two elements.

A further object is to provide an assembly that includes:

a) a frame, including at least one pedestal,
b) an axle carried by the pedestal to rotate relative thereto, the axle having an axis of rotation,
c) a drum beater carried by the axle,
d) a pedal carried by the frame to rotate the beater about said axis in response to pedal movement,
e) drum clamping means carried by the frame, and having separate clamping surfaces, at least two of which are each supported to pivot in multiple directions, said surfaces engageable with curved drum structure.

One embodiment of a clamping system according to the present invention comprises a first cap to engage a first surface of an object and a second cap to engage a second surface of the object. At least one of the caps has more than one degree of freedom.

Another embodiment of a clamping system according to the present invention comprises a top cap and a bottom cap, with the bottom cap being on a carrier plate. A clamping mechanism attached to one of the caps positions that cap such that the top cap is on the carrier plate. At least one of these caps is a swivel cap, which can mean that it is capable of pivoting in multiple axes of a plane.

Another embodiment of a clamping system according to the present invention comprises a top cap and a bottom cap, with the bottom cap being on a carrier plate. A clamping mechanism attached to one of the caps positions that cap such that the top cap is on the carrier plate. At least one of the caps is on a pivot assembly.

Yet another embodiment of a clamping system according to the present invention combines features of the above two embodiments: at least one cap is capable of pivoting on all the axes of a plane that is parallel to a pivot assembly.

One embodiment of a drum beating assembly for use with a drum according to the present invention includes a frame with a pedestal, an axle carried by the pedestal, a drum beater on the axle, and a pedal connected to the axle used to rotate the beater. The drum beating assembly also includes one of the above clamping systems, which is used to connect the assembly to a rim of the drum.

One embodiment of a bass drum assembly according to the present invention includes a bass drum with a bass drum rim, a drum beating assembly, and a means to connect the bass drum rim and the drum beating assembly. In this embodiment, the means to connect includes a clamping system with a first cap and a second cap, where one of these caps has more than one degree of freedom.

These and other objects and advantages of the invention, as well as the details of an illustrative embodiment, will be more fully understood from the following specification and drawings.

DETAILED DESCRIPTION OF THE INVENTION

Figure 1:
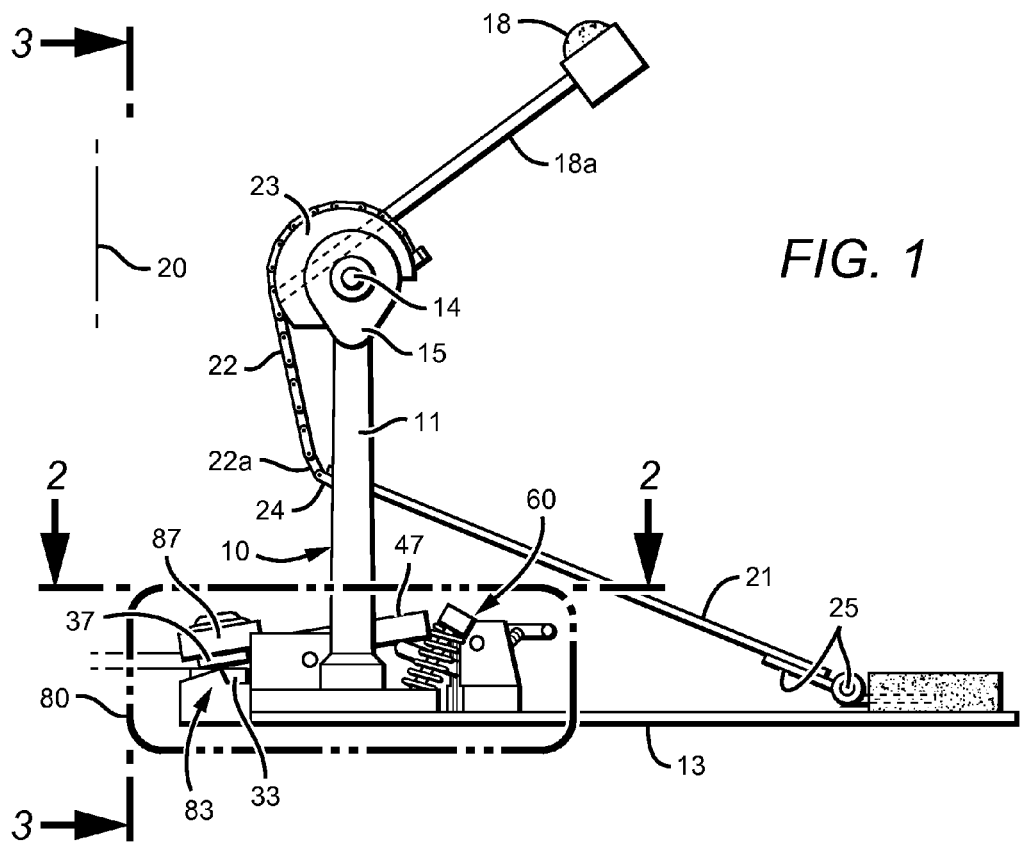
FIG. 1 is a side elevation view of drum beater apparatus incorporating elements of the invention.

The present invention provides a clamping system capable of connecting a drum beating assembly with a drum. For foot-operated drum beating assemblies, often used with bass drums, the repeated and sometimes violent operation motion can cause the drum beating assembly to become displaced. In order to remedy this problem, drum beating assemblies can be clamped to a bass drum rim such that the assembly is appropriately positioned with respect to the bass drum head. Some clamping systems can still cause the drum beating assembly and/or drum to become displaced, or can cause deterioration or warping of the drum rim. Embodiments of the present invention can include clamp surfaces that are on a swivel, and thus can adjust to spatial variations caused by the operative foot motion. Further, the clamp surfaces, sometimes themselves on a swivel, can also be placed on a pivot, further reducing drum or drum beating assembly displacement, warping, or deterioration.

It is understood that when an element is referred to as being "on" another element, it can be directly on the other element or intervening elements may also be present. Furthermore, relative terms such as "inner", "outer", "upper", "top", "above", "lower", "bottom", "beneath", "below", and similar terms, may be used herein to describe a relationship of one element to another. Terms such as "higher", "lower", "wider", "narrower", and similar terms, may be used herein to describe angular relationships. It is understood that these terms are intended to encompass different orientations of the elements or system in addition to the orientation depicted in the figures.

Although the terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present invention.

Embodiments of the invention are described herein with reference to view illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the invention.

Types of movement in the current application are in some instances described using six degrees of freedom. Three degrees of freedom are translational, or translation degrees of freedom: moving up and down or in the z direction on an x-y-z coordinate plane (vertical), moving left and right or in the x direction (lateral), and moving forward and backward or in the y direction (straight). Three other degrees of freedom are rotational, or rotation degrees of freedom: rotating left and right or in the x-y plane (yaw), rotating forward and backward or in the y-z plane (pitch), and rotating side to side or in the z-x plane (roll).

In the drawings, the drum beating assembly 10 includes a frame having at least one, and preferably two, upright pedestals 11 and 12 mounted on the horizontal base plate 13. An axle 14 is carried by the pedestals, as via suitable bearings in housings 15 and 16, the axle having a horizontal axis 17 of rotation. A drum beater 18 has a stem 18a carried by the axle at 19 to be rotated forwardly to strike a head, indicated at 20.

A foot pedal 21 is operatively connected to the axle, as via a chain 22 engaging a sprocket 23, the end of 22a of the chain being connected at 24 to the forward end of the pedal 21. The rearward end of the pedal is pivotally connected at 25 to the base plate 13.

Figure 7:
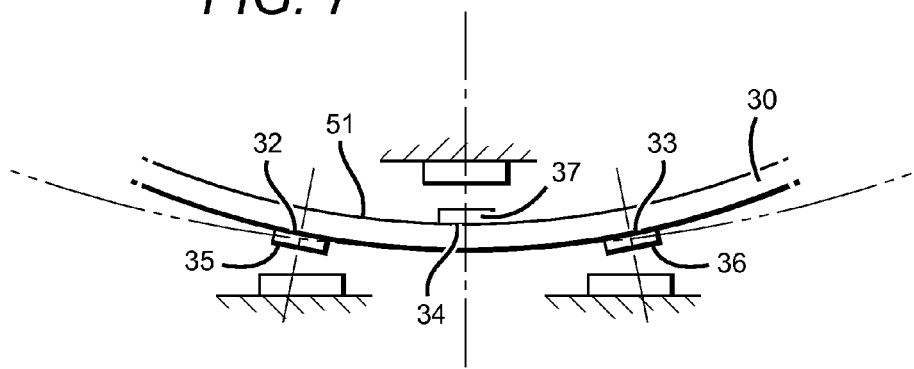
FIG. 7 is a schematic front elevation view showing elements engagable with a curved drum rim for adjustable clamping.

In accordance with an important aspect of the invention, an arcuate bass drum rim 30 is positioned to be self-adjustably clamp connected to the base plate, as for example via connections schematically shown by structures indicated in FIG. 7. Such structures include multiple drum rim support elements carried to engage the drum rim at multiple locations, as for example are indicated at 32-34, to support the drum rim relative to the base plate. The corresponding elements are shown at 35-37, elements 35 and 36 engaging the convex outer side of the rim, and element 37 engaging the concave inner side of the rim. The rim engaged side of such elements may have slight curvature to match rim curvature.

Figure 8:
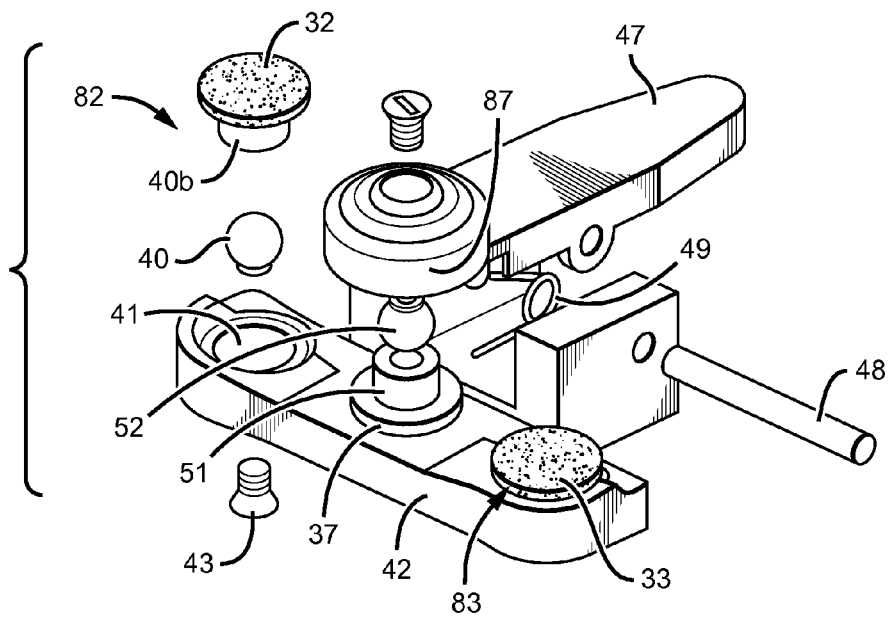
FIG. 8 is an exploded view showing elements of one embodiment of a drum rim clamping mechanism.
Figure 9:
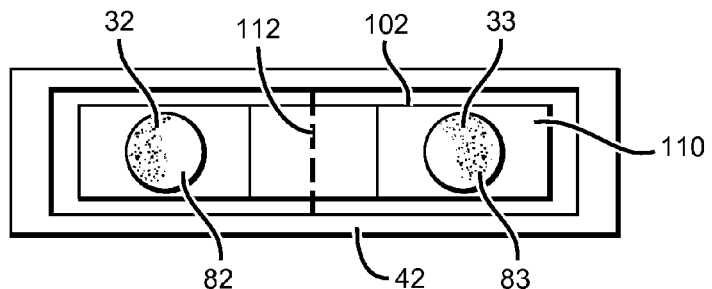
FIG. 9 is a schematic top view of a carrier plate including swivel caps mounted on a pivot assembly.

FIG. 8 shows actual such elements in the form of two swiveling caps, corresponding to FIG. 9 elements 32 and 33, having sockets 40a that embrace balls 40 received in recesses 41 in a carrier plate 42, part of the sub-assembly as shown. Plate 42 is attached or attachable as by fasteners 42a to the base plate. Balls 40 are also attached to the plate 42 as by fasteners 43 (see FIG. 4). Sockets 42a swivel in sockets 42b. A third swiveling cap corresponds to element 37 and is carried by the clamp arm 47, pivoted at pin 48, and urged by spring 49 in a counterclockwise direction in FIG. 8 to urge cap 37 downwardly against the drum inner concave surface 51. Cap 50 is carried by a swiveling socket 51 that receives ball 52. The balls and swiveling sockets and caps define toggle connections that self-adjust to conform to the particular drum rim being retained. The sub-assembly shown in FIG. 8 is well adapted to attach to an existing pedal unit, as on base plate 13, to enable its efficient use to firmly support a bass drum, as during beating use.

Further adjustments as respects connection of the sub-assembly to a support plate, are shown at 60 in FIG. 1. See in this regard U.S. Pat. No. 5,627,332, incorporated by reference fully herein.

Figure 4:
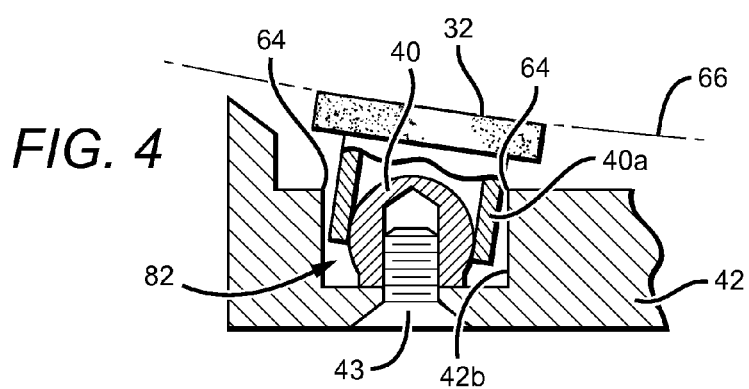
FIG. 4 is a fragmentary section view taken along line 4-4 of FIG. 2.
Figure 5:
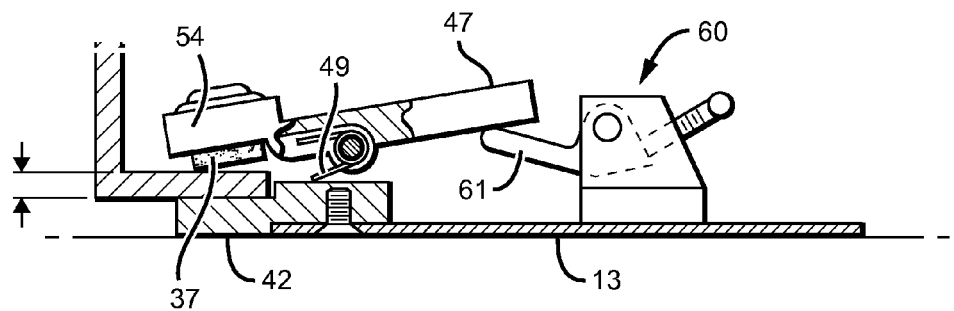
FIG. 5 is a section view taken along line 5-5 of FIG. 2.

FIG. 4 shows reception of a socket 40a in a recess or socket 42b in the clamp plate 42 to swivel relative to the fixed position ball 40. Recess or socket annular edge is engagable by the socket 40a outer wall to limit swiveling of the cap 32, blocking extreme swiveling and thereby maintaining the cap oriented generally toward the drum rim indicated by curved line 66, minimizing need for self-adjustment swiveling for assembly and ease of use purposes.

The invention is further characterized by:
a) multiple drum rim support elements carried to engage the drum rim at multiple locations to support the drum rim relative to the base plate;
b) at least one of said elements being pivotally self-adjustable during engagement of said elements with the drum rim;
c) at least two of such elements being pivotally adjustable during engagement of said elements with the drum rim;
d) at least three of said elements being pivotally adjustable during engagement of said elements with the drum rim;
e) two of such elements being located to engage the convex side of a drum rim that has both convex and concave sides;
f) a third of said elements being located to engage the concave side of the drum rim;
g) the elements being selectively toggle supported;
h) a carrier or plate (part of a sub-assembly) connectable to said base plate, the carrier carrying at least two of said elements, that are engagable with the convex side of a drum rim;
i) the third element carried by the clasp arm to engage the concave side of the drum rim, in response to arm pivoting relative to the base plate.

Figure 2:
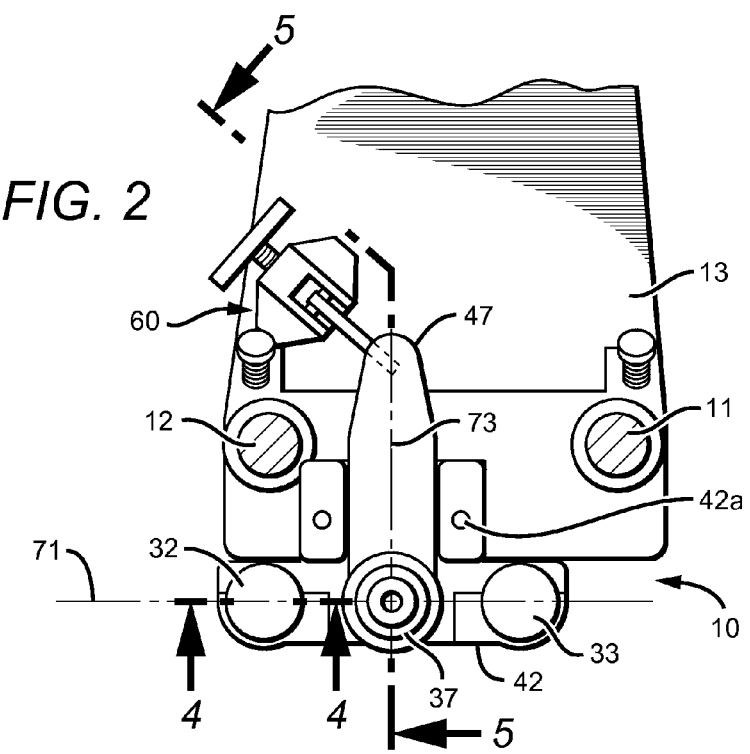
FIG. 2 is a plan view taken along line 2-2 of FIG. 1.
Figure 3:
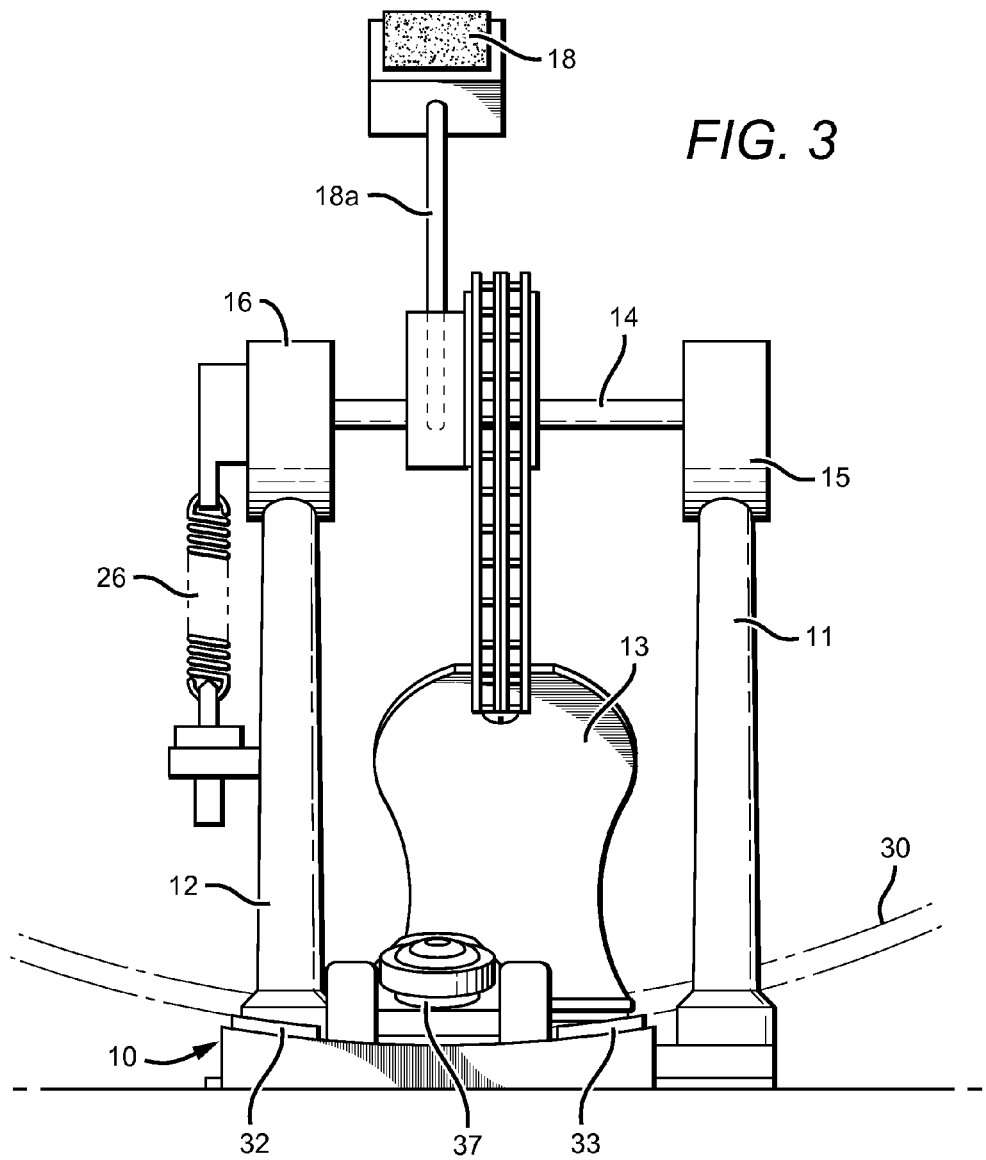
FIG. 3 is a front elevation view taken along line 3-3 of FIG. 1.

It will be noted in FIG. 2 that the third element or cap 37 is located in an upright plane 70 substantially normal to an axis 71 passing through the two elements 32 and 33.

An alternative explanation of FIGS. 1-8 is as follows. FIG. 1 shows a side view of a drum beating assembly 10 having two upright pedestals 11 and 12, although assemblies with less or more than two upright pedestals are also possible. The pedestals 11 and 12 are mounted on horizontal base plate 13. An axle 14 is held between the tops of the pedestals 11 and 12. In a preferred embodiment the axle 14 is itself rotatable, although in other embodiments it may be static. Although the FIG. 1 embodiment has one axle 14, other double-beater embodiments may comprise two axles that are independently rotatable. In one such embodiment the axles are separated by a housing; in another such embodiment the axles are separate, but both mounted on a central static axis such that the rotatable axes rotate about the static axis. Double-beater embodiments are described in U.S. Pat. No. 5,421,235, the figures and descriptions of which are incorporated by reference fully herein. The components of embodiments of the current invention are suitable for use with or can be suitably altered for use with double-beater embodiments.

The drum beating assembly 10 can comprise a sprocket 23 and beater stem 18a attached to the axle 14. The axle 14 and sprocket 23 can rotate together, or the sprocket 23 can rotate independently of the axle 14. The beater stem 18a can rotate simultaneously with the axle 14, the sprocket 23, or in a preferred embodiment both. A chain 22 can be attached on one end to the sprocket 23 and on another end to a foot pedal 21. In other embodiments, the chain can be replaced by a strap made of, for example, leather or nylon.

In a preferred embodiment having components of the invention, a user pushes down on the foot pedal 21, which is itself connected to a base plate 13 at a connection 25, which can be a hinge connection. In response, the end of the chain 22a and the remainder of the chain 22 are also pushed down, causing the sprocket 23, the axle 14, and the beater stem 18a, and thus the beater 18, to rotate (in FIG. 1, in a counterclockwise direction) until the beater 18 hits a drum head 20. In a preferred embodiment, beater 18 hits drum head 20 directly; that is to say that at the time of impact beater stem 18a is parallel or tangential to the surface of impact and beater 18 is travelling perpendicular to the impact surface. After the completion of this motion and the release of the drum pedal 21, the spring system 26 (shown in FIG. 3) causes the system to return to its initial state. In a preferred embodiment, the spring system 26 is attached to the axle 14, which is itself attached to beater stem 18a and sprocket 23. The spring system therefore causes the stem 18a and the sprocket 23, and in a preferred embodiment the rotatable axle 14, to rotate backwards (in FIG. 1, in a clockwise direction) to their original positions.

When the above motion is repeated or performed in a violent manner, as can often be the case in performances involving bass drums, the drum beating assembly 10 might move from its position in relation to the drum head 20. Such movement is undesirable as the beater 18 will no longer impact the drum head 20 while travelling perpendicular to the impact surface, and thus may produce a sound that is not as desirable as if the beater 18 had impacted the drum head 20 perpendicularly. As such, it is desirable to design a system to secure the drum beating assembly 10's position with respect to the drum head 20. In accordance with an embodiment comprising elements of the present invention, the drum beating assembly 10 can be attached to a bass drum rim 30 (shown in FIG. 7) using a connection such as a clamping system. Connections are described in detail in U.S. Pat. Nos. 5,627,332 and 6,992,244, fully incorporated by reference herein.

Even when a connection system is designed to prevent the above problems, warping of the drum rim 30 can occur. The drum head 20, drum rim 30, and/or base plate 13 and foot pedal 21 may also be caused to rock or tilt, leading to an undesirable striking motion or discomfort for the user. Addressing these problems is one goal of devices comprising elements of the current invention.

The dashed lines in FIG. 1 indicate an area comprising clamping system 80. Clamping system 80 comprises a clamp head assembly 87 and clamp support assemblies 82 (not shown) and 83. The clamp head assembly and the clamp support assembly 82 are shown in an exploded view in FIG. 8. Clamp support assemblies 82 and 83 comprise caps 32 and 33, respectively, which can be swivel caps.

An alternative explanation of how clamp support assemblies 82 and 83, one of which is shown in a cross-sectional view in FIG. 4, is described below. A recess or socket 42b, within a base such as the carrier plate 42, is defined by annular edges 64. Other embodiments do not comprise a socket 42b. The carrier plate 42 can be a separate element attached to the horizontal base plate 13, or can be part of the horizontal base plate 13. In preferred embodiments, the socket 42b is cylindrical. A ball or sphere 40, which in a preferred embodiment is a fixed-position ball, can be attached to the bottom of the recess or socket 42b. In embodiments without a socket 42b, the ball 40 can be attached, for example, to the carrier plate 42 or the horizontal base plate 13. In a preferred embodiment a fastener 43 is used to attach the ball 40. In other embodiments, the ball 40 could be molded to the bottom of the recess 42b, could be attached using an adhesive such as an epoxy, or could simply use gravity to remain on the floor of recess 42b.

A socket or recess 40a below the cap 32 is defined by an outer wall 40b, which is attached to the underside of the cap 32, which is preferably a swivel cap. The outer wall 40b can be shorter than the annular edges 64 such that the outer wall 40b does not rest on the bottom surface of recess 42b. Outer wall 40b can be one continuous wall or formed by several sections. In one embodiment, the recess 40a is substantially cylindrical and outer wall 40b is substantially a hollow cylinder, although other shapes for either are possible. In a preferred embodiment, the diameter of recess 40a approximately matches the diameter of ball 40. This arrangement can enable swivel cap 32 to be above the upper edge of recess 42b, where it can engage a drum rim 66.

The below description describes the clamp support assembly 82, although it can also apply to the clamp support assembly 83. The swivel cap 32 and outer wall 40b can be attached in a number of manners. In a preferred embodiment, the diameter of the recess 40a is slightly smaller at the bottom of the wall than above the bottom of the wall, such that the slightly smaller diameter is approximately equal to or very slightly smaller than the diameter of the ball 40. The swivel cap 32 and outer wall 40b could then be secured in a number of ways. The outer wall 40b can be formed from separate pieces around the ball 40 such that the bottom of the outer wall 40b, with a diameter slightly smaller than the ball 40, is below the horizontal diameter of the ball. This method is particularly applicable if the ball 40 and the outer wall 40a are stiff materials such as some types of metal. In another method, the outer wall 40a is forcibly pushed down over the ball 40. This method is particularly applicable if there is some give in the wall 40b that allows the recess 40a to slightly expand when forced over the ball 40, and then slightly retract once the diameter of the recess 40a is a slightly larger width of the ball 40 (below the horizontal diameter of the ball). By making the diameter of the outer wall 40b slightly smaller than the horizontal diameter of the ball 40, the bottom of the outer wall 40b can be prevented from accidentally being lifted and detached from the ball 40.

The above arrangement can enable cap 32 to swivel, (defined for the purposes of the current application as) or pivot on multiple axes in a plane (and in preferred embodiments, pivot on all the axes of a plane). The cap can be said to have two degrees of freedom, in that it can roll in a z-x plane and/or pitch in a y-z plane. The swivel cap of this embodiment can do both at the same time. A swivel cap 32 can thus swivel to match the angle of the drum rim line 66 as shown in FIG. 4. In addition to being pivotally self-adjustable in just one plane similar to an object pivoting on one axis, the shape of the ball 40 actually allows the swivel cap 32 to swivel adjust when engaged with the drum rim (e.g., swivel cap can pivot parallel to line 4-4 in FIG. 2, perpendicular to line 4-4, or along any plane in between).

For a more secure fit and to avoid the swivel cap 32 damaging the drum rim, the top surface of swivel cap 32 can be slightly concave or convex so as to match the curvature of the drum rim line 66. This arrangement can therefore allow for the curvature of the drum rim as opposed to the flat clamps of the prior art. This can prevent both warping and destruction of the drum rim. The swivel cap 33 and the swivel cap 37 can also be concave or convex to match the curvature of the drum rim.

The swivel caps 32 and 33, socket outer wall 40b, and the ball 40 can be made from any number of materials. In some embodiments, these elements can be made from stiff metal, malleable metal, plastic, rubber, woven material, or combinations thereof. For example, swivel caps 32 and 33 can be formed of metal and covered by a layer of rubber. While other elements can also be made of this material, thin aluminum or other metal may be a particularly useful material for outer wall 40b, as a wall of thin aluminum or other metal may be able to expand and retract as described above.

Figure 6:
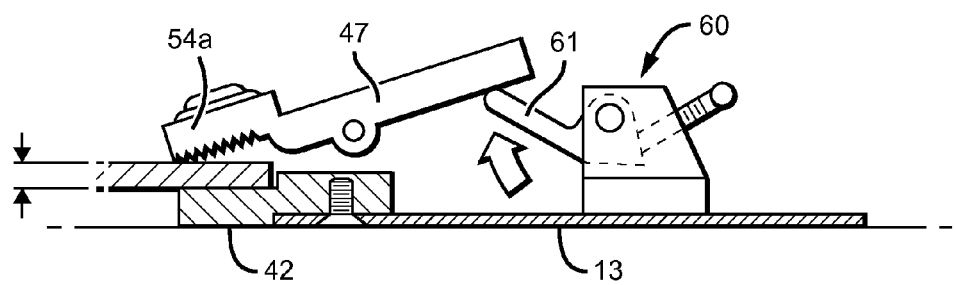
FIG. 6 is a section view taken along line 5-5 of FIG. 2 of another embodiment incorporating elements of the invention.

As can be seen in FIG. 8, clamp head assembly 87 can comprise features similar to those of clamp support assemblies 82 and 83. A swivel cap 37 can be attached to a socket 51 defined by outer wall 51b, which can surround ball 52. In the embodiment of FIG. 8, the ball 52 is attached to a clamp head 54. The clamp head 54 can be a larger diameter than swivel cap 37. The ball 52 can be secured to the clamp head 54 by a screw 53, or can be attached in a manner similar to that of ball 40. The clamp head 54 can be attached to a clamping mechanism such as a clamp arm 47. If a clamp head 54 is present, it can have a textured surface as shown in FIG. 6 for a better grip in the event that the clamp head 54a engages the drum rim 30. In other embodiments, the ball 52 can be attached to the clamp arm 47 or other clamping mechanism.

As best shown in FIG. 8, in one embodiment the clamp arm 47 can have a pivot point 48, which can itself also be attached to other elements of the drum beating assembly 10 such as the upright pedestals 11 and 12 and/or the horizontal base plate 13. A spring 49 can also be positioned under the clamp arm 47. The spring 49 can function so that the default position of clamp head assembly 87 is raised until another force pushes the clamp head assembly 87 down.

The clamp head assembly 87 can be positioned or lowered or the bottom support clamp assemblies 82 and 83 can be positioned or raised such that the cap 37 is on a carrier plate 42, often with intervening objects such as a drum rim. The clamp head assembly 87 can be lowered in a number of ways. The clamp head assembly can either be lowered rotationally (in FIGS. 5 and 6, counterclockwise) or straight down, or positioned in another manner. In a preferred embodiment shown in FIGS. 5 and 6, a screw mechanism 60 lowers and raises screw arm 61. Screw arm 61 engages and raises the back end of clamp arm 47, therefore lowering clamp head assembly 87. While in FIG. 5 the swivel cap 37 is shown as tilted in comparison to the drum rim, in preferred embodiments the swivel cap is actually flush with and parallel to the drum rim, or parallel to the tangent line of the drum rim. The screw mechanism 60 locks screw arm 61 in an upward position until unscrewed. Other embodiments of mechanisms to raise the back end of clamp arm 47 are also possible. Other embodiments with mechanisms to lower clamp head assembly without a pivot are also possible; for instance, the clamp head assembly 87 can be lowered using gravity and screwed such that the assembly 87 is fixed in place.

The above description describes an embodiment having three caps (preferably swivel caps) 32, 33, and 37, although the components of the drum beating assembly can be suitably altered to accommodate two or more caps, some of which can be swivel caps. In a preferred embodiment, the caps are in plane with one another, as shown in FIG. 2. In a more preferred embodiment, the plane is perpendicular to the horizontal base plate 13 and/or the carrier plate 42. The swivel caps 32 and 33 can engage the convex outer surface of the drum rim 30 and the swivel cap 37 can engage the concave inner surface of the drum rim 30. In preferred embodiments the arrangement of swivel caps is symmetrical, although other arrangements are possible. One preferred arrangement of the swivel caps 32, 33, and 37, the swivel cap 37 is equidistant between the swivel caps 32 and 33, and can clamp the lower quadrant point 31 of the drum rim 30. In a second preferred arrangement, the swivel cap 37 is placed near the lower quadrant point 31 such that the drum beater 18 will strike the center of the drum head 20. In a multi-beater drum beating assembly, this can mean that the drum beaters will strike points equidistant from the center of the drum head 20. The swivel caps 32 and 33 can engage the drum rim 30 at points wide enough to provide stability to the connection, but close enough to the lower quadrant point 31 so as to make the size of the drum beating assembly 10 practical.

FIG. 9 shows a top view of an embodiment of the carrier plate 42 comprising components of the invention. As previously mentioned, the horizontal base plate 13 or another element can substitute for the carrier plate 42 if a carrier plate is not present. In this embodiment, the swivel caps 32 and 33 are capable of both swivel adjusting and pivot adjusting. The carrier plate 42 can surround a gap 102. A pivot assembly 110 can be mounted within the gap 102. The pivot assembly 110 can comprise a pivot 112, which in a preferred embodiment is connected at both ends to the carrier plate 42, or in other embodiments connected in a different manner. The pivot 112 can run through the pivot assembly 110, or can be on the top surface or the bottom surface of the pivot assembly 110. In a preferred embodiment the pivot 112 is in the center of the pivot assembly 110. The support assemblies 82 and 83, which can comprise the swivel caps 32 and 33 respectively, can be mounted on the pivot assembly 110 in any of the manners described above, including but not limited to the use of a fastener, molding, or an adhesive. In a preferred embodiment the ball 40 is attached to the pivot assembly 110.

Figure 10:
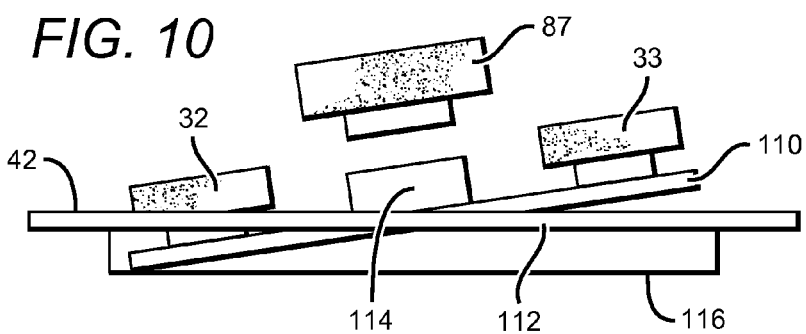
FIG. 10 is a schematic front view of a carrier plate including swivel caps mounted on a pivot assembly.

FIG. 10 shows a front view of an embodiment of the carrier plate 42 comprising the same elements as FIG. 9 and further showing the clamp head assembly 87. As can be seen in FIG. 10, pivot assembly 110 (and thus the elements present on the pivot assembly) can rotate about pivot 112.

Embodiments like that of FIG. 9 and FIG. 10 enable the swivel caps 32 and 33 to adjust or self-adjust to the weight of the drum and/or the movements of the drum rim in two different ways: the swivel caps 32 and 33 can swivel adjust (in a preferred embodiment, about the balls 40, not shown), pivot adjust about pivot 112, or both, thus allowing a large range of adjustment. Another manner of describing this capability is that a cap is capable of pivoting in all axes of a plane, and the plane itself (and therefore the axes of that plane) is also capable of pivoting. The cap has two degrees of freedom in that it can roll in a z-x plane and/or pitch in a y-z plane at the same time. Further, the cap can be on a pivot assembly which has one degree of freedom in that it can roll in a z-x plane. In a case where the cap is not on the pivot point of the pivot assembly, the coordinate system of the cap's degrees of freedom and the pivot assembly's degree of freedom can have different origins, meaning that the cap will have a total of three different degrees of freedom (rolling and pitching in one coordinate system, and rolling in second coordinate system). Other caps with more than three degrees of freedom, which may be in one, two, or more coordinate systems, are also possible. The swivel caps 32 and 33 can be arranged to swivel on a plane parallel to the pivot assembly. Other embodiments include caps that cannot swivel, but only pivot on the pivot assembly 110, and thus only have one degree of freedom.

Pivot assembly 110 can have many shapes, with one shape being flat (other than the presence of support assemblies 82 and 83 and/or the pivot 112). FIG. 10 shows pivot assembly 110 comprising a raised portion 114. This raised portion can be centered on the pivot assembly 110. The embodiment of FIG. 10 also includes an optional pivot assembly stop 116. Stop 116 can be used to ensure that the pivot assembly 110 does not over-rotate. Other embodiments do not comprise a pivot assembly stop 116.

Many embodiments incorporating some of these elements are also possible. While in the FIG. 9 and FIG. 10 embodiment the support assembly mount 110 is surrounded by the gap 102 and the carrier plate 42, in other embodiments, other elements such as, for example, a portion of the horizontal base plate 13 could serve for the carrier plate 42. Other embodiments without a gap are also possible; for example, the support mount assembly could be mounted above the carrier plate 42 or the horizontal base plate 13. In such embodiments, the carrier plate 42, the horizontal base plate 13, and/or the ground could substitute for the pivot assembly stop 116 if desired. Embodiments with multiple pivot assemblies are also possible. In such an embodiment, each support assembly could be mounted on its own pivot assembly, with each pivot assembly capable of independent pivoting.

The embodiments shown in FIGS. 9 and 10 and similar embodiments have several advantages over prior art embodiments. Similar to the embodiments shown in FIGS. 1-8, the presence of swivel caps can prevent drum warping and provide more stable support since the caps adjust to the angle of the drum. The embodiments of FIGS. 9 and 10 allow further pivot adjustment. The caps can prevent warping by adjusting so as to redistribute the forces between the caps and the drum rim. In some embodiments, the caps adjust so that the force on each cap from the drum rim is evenly distributed along the rim's contact surface (where the rim and cap are in contact). Further, the caps can themselves have a concave or convex surface which also helps prevent warping and provides stability. Prior art clamp connections can also cause a rocking motion of the drum beating assembly and the drum. This can be caused by the inability of prior art assemblies to adjust to slight movements of the bass drum; instead, the assembly, the bass drum, or both will rock or tilt, causing discomfort for the user. Embodiments of the current invention can adjust to the drum's slight movements to prevent rocking without compromising the security of the clamp connection or the alignment of the drum beater.

The use of a pivot assembly provides further advantages over the prior art. As previously discussed, if a clamping system is not placed precisely on the drum rim, the drum beating apparatus can be caused to lift off the floor after it is tightened. The pivot assembly can adjust if the clamping system is placed imprecisely such that the drum beating apparatus remains flat on the floor. This is also the case if the floor is uneven; the pivot assembly can adjust for the unevenness of the floor to provide a secure clamp and allow the drum beating apparatus to remain flat and stable. In addition, if for some reason the drum operator did not wish the drum beating apparatus to be centered on the drum, the pivot assembly could allow the drum beating apparatus to be placed off-center.

Although the present invention has been described in detail with reference to certain preferred configurations thereof, other versions are possible. Therefore, the spirit and scope of the invention should not be limited to the versions described above.

I claim:
1. A clamping mechanism comprising:
   a body;
   two bottom caps on a pivot assembly configured to pivot about a pivot axis, said pivot axis connecting said pivot assembly to said body, said two bottom caps on opposite sides of said pivot axis;
   a top cap above said bottom caps; and a clamp arm attached to said top cap and on said body;

wherein said clamp arm is configured to position said top cap such that said top cap is nearer to or further from said pivot assembly.

2. The clamping mechanism of claim 1, wherein each of said two bottom caps is a swivel cap.

3. The clamping mechanism of claim 1, wherein each of said two bottom caps and said top cap comprises a concave contact surface or a convex contact surface.

4. The clamping mechanism of claim 1, wherein said body comprises a pivot assembly stop below said pivot assembly.

5. The clamping mechanism of claim 1, wherein at least one of said bottom and top caps is a swivel cap.

6. The clamping mechanism of claim 1, wherein said two bottom caps and said one top cap are swivel caps.

7. The clamping mechanism of claim 1, wherein said body is shaped to define a gap; and wherein said pivot assembly is configured to pivot within said gap.

8. The clamping mechanism of claim 7, wherein said body comprises a pivot assembly stop below said gap.

9. The clamping mechanism of claim 7, wherein said pivot axis transverses said gap.

10. The clamping mechanism of claim 7, wherein said pivot axis runs through said pivot assembly.

11. The clamping mechanism of claim 7, wherein said body comprises a base plate and a carrier plate.

12. The clamping mechanism of claim 11, wherein said base plate or said carrier plate comprises a pivot assembly stop.

13. The clamping mechanism of claim 4, wherein said pivot assembly stop comprises a portion of a base plate or a carrier plate.

14. A clamping system comprising:
a plate comprising a base plate or a carrier plate;
a pivot assembly on said plate, said pivot assembly comprising a pivot axis;
first and second caps on said pivot assembly and configured to engage a first surface of an object;
a clamp arm on said plate and configured to engage a second surface of said object opposite said first surface;
wherein said first and second caps are on opposite sides of said pivot axis.

15. The clamping system of claim 14, wherein said first, second, and third caps are approximately in a plane with one another, and wherein said plane is approximately perpendicular to said plate.

16. The clamping system of claim 14, wherein said first and second caps are concave.

17. The clamping system of claim 14, wherein at least one of said first and second caps is a swivel cap pivotable along more than two axes in a plane.

18. The clamping system of claim 14, wherein said clamp arm comprises a third cap configured to engage said second surface.

19. A drum pedal assembly, comprising:
a base plate;
a frame on said base plate;
a carrier plate on said base plate;
a clamp arm on said base plate;
a pivot assembly on said carrier plate, said pivot assembly comprising a pivot; and
first and second caps on said pivot assembly and on opposite sides of said pivot.

20. The drum pedal assembly of claim 19, wherein said pivot is attached to said carrier plate.

21. The drum pedal assembly of claim 19, wherein said carrier plate is shaped to define a gap; and wherein said pivot assembly is configured to pivot within said gap.

22. The drum pedal assembly of claim 21, wherein said pivot is in said gap.

23. The drum pedal assembly of claim 21, wherein said pivot transverses said gap.

24. The drum pedal assembly of claim 21, further comprising a pivot assembly stop below said gap.

25. The drum pedal assembly of claim 24, wherein said pivot assembly stop is a portion of said base plate.

26. The drum pedal assembly of claim 24, wherein said pivot assembly stop is a portion of said carrier plate.

27. The drum pedal assembly of claim 19, further comprising a third cap on said clamp arm.

28. The drum pedal assembly of claim 19, wherein said pivot assembly is on said clamp arm.

29. The drum pedal assembly of claim 19, wherein at least one of said first and second caps is a swivel cap.

30. The drum pedal assembly of claim 19, wherein said first and second caps are configured to engage a first surface of a curved bass drum rim.

31. The drum pedal assembly of claim 30, wherein said first and second caps are angled toward one another.

32. The drum pedal assembly of claim 19, wherein said first and second caps are angled toward one another.

* * * * *